United States Patent [19]

Bordner

[11] Patent Number: 5,283,121
[45] Date of Patent: Feb. 1, 1994

[54] CORROSION AND ABRASION RESISTANT INDUSTRIAL ROLL COATING WITH NON-STICKING PROPERTIES

[76] Inventor: Barry A. Bordner, Holley Ave., Northfield, Mass. 01360

[21] Appl. No.: 789,369

[22] Filed: Nov. 8, 1991

[51] Int. Cl.⁵ .............................................. B32B 15/00
[52] U.S. Cl. ..................... 428/381; 428/379; 428/380; 428/375; 428/387; 492/54; 492/58
[58] Field of Search .............. 428/379, 380, 381, 389; 29/132

[56] References Cited

U.S. PATENT DOCUMENTS

| | | |
|---|---|---|
| 2,367,796 | 1/1945 | Petersen et al. ............ 29/132 |
| 3,942,230 | 3/1976 | Nalband ...................... 29/132 |
| 4,069,570 | 1/1978 | Pospisil et al. ............. 29/132 |
| 4,391,879 | 7/1983 | Fabian et al. ............... 29/132 |
| 4,522,866 | 6/1985 | Nishikawa et al. .......... 29/132 |
| 4,546,527 | 10/1985 | Fukuda et al. .............. 29/132 |
| 4,704,776 | 11/1987 | Watanabe et al. ........... 29/132 |
| 4,856,161 | 8/1989 | Miihkinen ................... 29/132 |
| 4,914,796 | 4/1990 | Liay et al. .................. 29/132 |
| 4,951,392 | 8/1990 | Miihkinen ................... 29/132 |
| 4,963,404 | 10/1990 | Jenkins ...................... 29/132 |

FOREIGN PATENT DOCUMENTS

| | | | |
|---|---|---|---|
| 135558 | 7/1985 | Japan ..................... | 29/132 |
| 275511 | 11/1987 | Japan ..................... | 29/132 |
| 220912 | 9/1988 | Japan ..................... | 29/132 |

Primary Examiner—Patrick J. Ryan
Assistant Examiner—J. M. Gray
Attorney, Agent, or Firm—Kenyon & Kenyon

[57] ABSTRACT

A coating comprising a non-porous textured corrosion resistant and abrasion resistant base layer of metal is applied by a thermal flame spray process using a high-velocity oxy-fuel, and a top coating of a continuous film of fluoropolymer is used to enhance and protect the surface bare metal on industrial rollers in a multitude of industrial environments that are corrosive, abrasive or otherwise have elements present which tend to stick to the roller surface. The corresponding method comprises the steps of providing a body member having a relatively soft and corrodible metal first layer, applying a middle metal layer to the first layer by a high-velocity oxy-fuel type metal thermal spray process, applying an outer layer comprising a fluoropolymer coating over said middle layer to provide a non-sticking characteristic to the coating; and heating said outer layer to a level above the curing temperature of the fluoropolymer so as to bond the fluoropolymer to said middle layer.

5 Claims, 2 Drawing Sheets

CORROSION AND ABRASION RESISTANT INDUSTRIAL ROLL COATING WITH NON-STICKING PROPERTIES

FIELD OF THE INVENTION

BACKGROUND OF THE INVENTION

This invention relates to metallic coatings for metal articles prone to corrosion, and, more specifically, to an industrial metallic roll coating with abrasion resistant and release properties that has no through grain porosity.

Metallic roll coatings with abrasion resistant and release properties have in the past been produced using a porous plasma type or wire type flame spray plated based layer and an impregnated Teflon ® film top coat. It is believed that the through grain porosity in the plating has not offered completely adequate corrosion resistance in some cases. In fact, older processes such as wire type or plasma type flame spray plating processes are deficient because they do not result in through grain sealed properties, rather they are regarded as porous.

A known process for producing a composite metallic roll having a release surface is disclosed in U.S. Pat. No. 3,942,230 to Nalband. Nalband discloses application of a porous nickel chromium alloy (or other metal) by a flame spray process. Upon the resulting porous metal layer is deposited a fluorocarbon polymer (Teflon ®), which is subsequently heated so as to impregnate and cover the porous layer.

In Nalband and other known coating processes, the Teflon layer only provides a corrosion barrier ancillary to the Teflon's principle function of providing a release surface. In recent years, however, operating conditions in industries such as the production of pulp and paper and plastics have generated significantly more demanding requirements in respect to corrosion resistance which are not necessarily within the capabilities of Nalband and other previously known processes.

ADVANTAGES AND SUMMARY OF THE INVENTION

Accordingly, it is an advantage of the present invention to provide a coating for corrosion prone metal articles including, for example, an industrial roller, comprising an applied textured metal layer with no through grain porosity in order to provide a corrosion and abrasion resistant metal barrier layer over a bare metal article surface such as iron, steel, aluminum or other corrodible metal roller surfaces. Once the textured metal base coating is applied, a thin continuous film of Teflon is bonded over the top of the textured metal to provide a non-sticking or release property to the surface of the article. Further, as the softer Teflon wears, the peaks of the textured surface provide physical protection for the Teflon which lies bonded into the valleys of the textured metal.

It is another advantage of the present invention to provide a composite metallic article, particularly a roll, having highly anti-corrosive properties comprising a body member having a relatively soft and corrodible metal first layer; a middle layer comprising stainless steel, nickel, nickel chromium, or a nickel chromium carbide applied to the first layer by a high-velocity oxy-fuel type metal thermal spray process; and an outer layer comprising a Teflon coating top coated over said middle layer to provide a non-sticking characteristic to the coating.

It is a further advantage of the present invention to provide a method of making a composite metallic article, particularly a roll, having highly anti-corrosive and release properties comprising the steps of providing a body member having a relatively soft and corrodible metal first layer; applying a middle metal layer to the first layer by a high-velocity oxy-fuel type metal thermal spray process; applying an outer layer comprising a Teflon coating over said middle layer to provide a non-sticking characteristic to the coating; and heating said outer layer to a level above the curing temperature of the Teflon so as to set and bond the Teflon to said middle layer.

BRIEF DESCRIPTION OF THE DRAWINGS

The above and other features and advantages of the present invention will become apparent from the discussion hereinbelow of a specific, illustrative embodiment thereof presented in conjunction with the accompanying drawings, in which.

DESCRIPTION OF THE PREFERRED EMBODIMENTS

Figure 1:
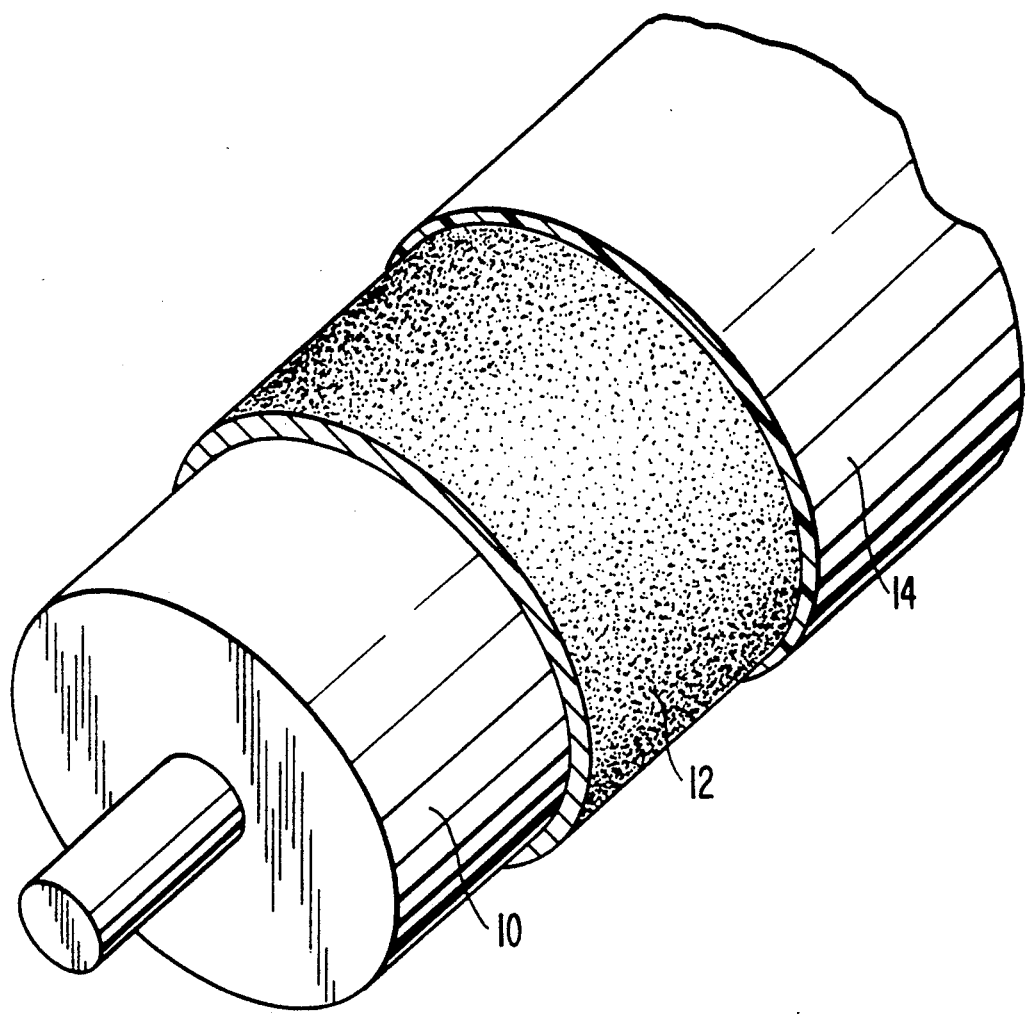
FIG. 1 is a broken perspective view of the coating of the present invention shown as applied on a typically shaped roller.
Figure 2:
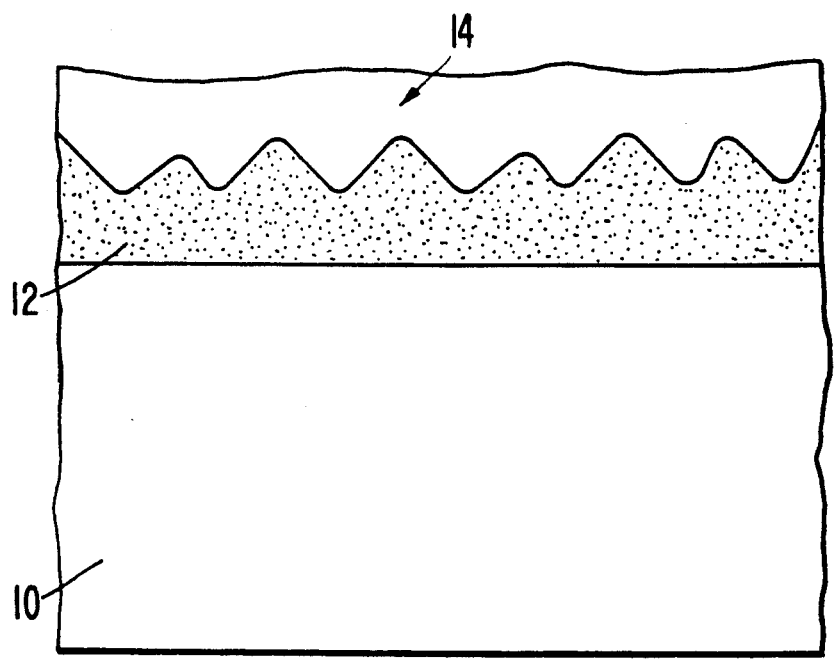
FIG. 2 is an enlarged cross sectioned detail showing the roller bare metal, the textured base metal coating and the teflon newly applied.
Figure 3:
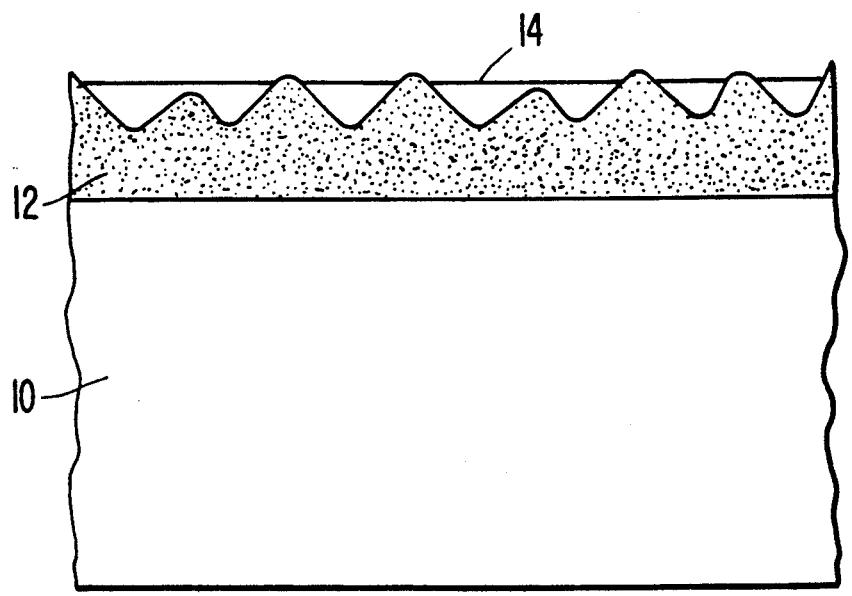
FIG. 3 is an enlarged cross sectioned detail showing the roller bare metal, the textured base metal coating and the teflon after the roll has been used.

In accordance with the present invention, a roll 5, or other metal article being prone to corrosion, comprising a bare metal first surface 10 such as iron, steel, aluminum or other corrodible metal roller surfaces is initially provided With a middle layer comprising a non porous textured metal coating 12 of stainless steel, nickel chromium, or nickel chromium carbide applied over the metal roller surface using a high velocity oxyfuel flame spray process, as produced, for example, by the Metco Perkin Elmer model DJ flame spray gun, to provide an impervious corrosion resistant layer. Before the application of the nonporous textured metal coating 12, it is abrasive grit blasted by known methods in order to increase the volume of its surface area and to provide increased mechanical bonding of the coating metal 12.

A multiple pass high velocity oxy-fuel process is used to obtain a non-porous textured base coating thickness of approximately 0.003" to 0.008" thick in order to insure proper sealing of the roller base metal 10. The non-porous metal coating 12 is applied with a surface finish of 150 to 400 $R_a$ to provide what may be visualized as a miniature peak and valley type of texture.

After the non-porous base metal coating 12 is applied, an outer layer 14 comprising one of the Teflon coatings as manufactured by the DuPont company, Polymer Products Division, is then bonded to the entire surface of the roll 5 in a thin film on the order of 0.001" to 0.006" thick. The exact formula or type of Teflon film used is determined by the final product's requirements for temperature resistance. The Teflon film is applied using a wet pressure spray process in single or multiple layers per the instructions for the grade, required thickness, or type of Teflon used. The Teflon coating 14 is then cured using elevated temperatures ranging from approximately 325° to 640° F. depending on which specific formula is selected for use. The heat used in curing the Teflon can be obtained from a conventional, convection or infrared, gas or electrically fired oven (not shown).

In practice, a roll or other metal article subject to corrosion in view of its relatively soft metal outer layer is coated with a metal layer by a high-velocity oxy-fuel type metal thermal spray process in order to achieve a surface with no through grain porosity. The middle metal layer is preferably applied to a thickness of 0.003" to 0.006" and is then abrasive grit blasting to a surface roughness of between 150 and 400 $R_a$. By achieving a roughened characteristic, which may be visualized as peaks and valleys, the middle metal layer has an increased surface area for bonding with an outer layer comprising a fluorocarbon polymer (Teflon), which is applied using a wet pressure spray process in single or multiple layers and then cured by heating the composite article to a level above the curing temperature of the Teflon.

The resulting composite metallic article exhibits not only release properties (due to the outer Teflon layer), but is more resistant to severe corrosion, a problem with composite metallic articles produced by previously available processes. Additionally, the above disclosed process which utilizes a noncorroding and textured middle layer provides the Teflon outer layer, which wears down in use, with additional protection from further wear by the highest level (or peak) of the harder middle layer. In other words, even when the outer Teflon layer is virtually completely worn down, Teflon will remain in the valleys of the textured middle layer, thus maintaining at least some release properties for the composite metal article. And, unlike in composite metallic articles produced by previously known processes, even an article whose outer Teflon covering has been worn down through use will continue to resist corrosion.

I claim:

1. A composite metallic roll having highly anti-corrosive properties comprising:
   a body member having a relatively soft and corrodible metal first layer;
   a textured, non-porous middle layer comprising stainless steel, nickel, nickel chromium, or a nickel chromium carbide applied to the first layer;
   said textured middle layer having a surface finish of 150 to 400 $R_a$; and
   an outer layer comprising a fluorocarbon polymer coating top coated over said middle layer to provide a non-sticking characteristic to the coating.

2. The composite metallic roll of claim 1 wherein said middle layer metal coating is applied 0.003" to 0.006" thick.

3. The composite metallic roll of claim 1 wherein the first soft metal layer is abrasive grit blasted to increase the volume of its surface area to increase mechanical bonding.

4. The composite metallic roll of claim 1 wherein the outer layer is a continuous film of bonded fluorocarbon polymer applied 0.001" to 0.006" thick.

5. The composite metallic roll of claim 1 wherein the textured middle layer is applied to the first layer by a high-velocity oxy-fuel type metal thermal spray process.

* * * * *